(12) United States Patent
Norbeck, Jr. et al.

(10) Patent No.: US 10,417,593 B1
(45) Date of Patent: Sep. 17, 2019

(54) SYSTEM AND METHOD FOR COMPARING COMPUTING RESOURCE OFFERINGS

(71) Applicant: VCE Company, LLC, Richardson, TX (US)

(72) Inventors: Donald Norbeck, Jr., Lafayette Hill, PA (US); Ryan J. Andersen, Belmont, MA (US); Seamus P. Kerrigan, Cork (IE); James A. Ellers, Portland, OR (US); Praphul Krottapalli, Cary, NC (US); Joshua L. Bonczkowski, Apex, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 584 days.

(21) Appl. No.: 14/587,974

(22) Filed: Dec. 31, 2014

(51) Int. Cl.
*G06Q 10/06* (2012.01)
*G06F 16/332* (2019.01)
*G06F 16/9535* (2019.01)

(52) U.S. Cl.
CPC ... *G06Q 10/06315* (2013.01); *G06F 16/3328* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 2005/0198105 A1* | 9/2005 | Schmitz | ............... | G06F 16/958 709/200 |
| 2007/0250838 A1* | 10/2007 | Belady | ............... | G06F 11/3409 718/105 |
| 2008/0313716 A1* | 12/2008 | Park | ............... | H04L 63/104 726/4 |
| 2011/0270916 A1* | 11/2011 | Shih | ............... | G06F 16/334 709/203 |
| 2012/0016721 A1* | 1/2012 | Weinman | ............... | G06Q 10/06 705/7.35 |
| 2012/0144364 A1* | 6/2012 | Lau | ............... | G06F 8/20 717/103 |
| 2013/0055091 A1* | 2/2013 | Dutta | ............... | G06F 3/04842 715/736 |

* cited by examiner

*Primary Examiner* — Kurtis Gills
*Assistant Examiner* — Akosua Kyereme-Tuah
(74) *Attorney, Agent, or Firm* — Polsinelli PC

(57) ABSTRACT

A system for comparing disparate computing resource offerings receives a request to compare at least one computing resource offering for a computing environment, the request including at least one infrastructure requirement and a computing environment design topology, the request associated with a unique order identifier, transmits the request to at least one computing resource provider via at least one provider application programming interface (API), the at least one computing resource provider comprising one of an external computing resource provider and an internal computing resource provider, receives a list of at least one computing resource offering from the at least one computing resource provider, normalizes the at least one computing resource offering based on the at least one infrastructure requirement and the computing environment design, and compares the at least one computing resource offering based on the at least one infrastructure requirement and the computing environment design topology.

20 Claims, 10 Drawing Sheets

SYSTEM AND METHOD FOR COMPARING COMPUTING RESOURCE OFFERINGS

TECHNICAL FIELD

Aspects of the present disclosure relate to computing devices and, in particular, to a system and method for comparing disparate computing resource offerings from one or more providers.

BACKGROUND

Computing resources used by enterprises, such as corporations and universities, are often provided by one or more cloud computing providers and hardware providers that offer hardware resources and software resources that function in a collaborative manner to meet the computing resource needs of the enterprise. The computing resources may be used to power one or more workloads, web sites, and/or software applications used by the enterprise. However, it may be difficult for IT representatives associated with the enterprises to determine the appropriate resources for the task at hand. IT representatives associated with the enterprises tend to select computing resources based on cost or familiarity, rather than based on appropriateness. Unfortunately, the IT representatives are unable to properly compare computing resources provided by one or more providers. They may not have the insight or data to make informed ordering decisions.

SUMMARY

According to one aspect of the present disclosure, a system for comparing disparate computing resource offerings aggregates available offerings from one or more computing resource providers, compares the available offerings, and provides information based on comparisons. The system determines current or desired workload performance, availability, configuration, cost, compliance, and/or security, normalizes the available offerings, compares the available offerings based on performance, availability, configuration, cost, compliance, and/or security, and provides information based on the comparisons.

According to one embodiment, the system includes one or more processors to receive a request to compare at least one computing resource offering for a computing environment, the request including at least one infrastructure requirement and a computing environment design topology, the request associated with a unique order identifier, transmit the request to at least one computing resource provider via at least one provider application programming interface (API), the at least one computing resource provider comprising one of an external computing resource provider and an internal computing resource provider, receive a list of at least one computing resource offering from the at least one computing resource provider, normalize the at least one computing resource offering based on the at least one infrastructure requirement and the computing environment design, and compare the at least one computing resource offering based on the at least one infrastructure requirement and the computing environment design topology, and send a graphical user interface representation of the list of the at least one computing resource offering based on the at least one infrastructure requirement and the computing environment design topology indicating appropriateness for the request.

According to another embodiment, a method includes receiving, by at least one processor, a request to compare at least one computing resource offering for a computing environment, the request including at least one infrastructure requirement and a computing environment design topology, the request associated with a unique order identifier, transmitting, by the at least one processor, the request to at least one computing resource provider via at least one provider application programming interface (API), the at least one computing resource provider comprising one of an external computing resource provider and an internal computing resource provider, receiving, by the at least one processor, a list of at least one computing resource offering from the at least one computing resource provider, normalizing the at least one computing resource offering based on the at least one infrastructure requirement and the computing environment design, and comparing the at least one computing resource offering based on the at least one infrastructure requirement and the computing environment design topology, and sending, by the at least one processor, a graphical user interface representation of the list of the at least one computing resource offering based on the at least one infrastructure requirement and the computing environment design topology indicating appropriateness for the request.

According to a further embodiment, a non-transitory computer-readable medium includes instructions stored thereon that, when executed by at least one processor, cause the at least one processor to perform operations including receiving a request to compare at least one computing resource offering for a computing environment, the request including at least one infrastructure requirement and a computing environment design topology, the request associated with a unique order identifier, transmitting the request to at least one computing resource provider via at least one provider application programming interface (API), the at least one computing resource provider comprising one of an external computing resource provider and an internal computing resource provider, receiving a list of at least one computing resource offering from the at least one computing resource provider, normalizing the at least one computing resource offering based on the at least one infrastructure requirement and the computing environment design, and comparing the at least one computing resource offering based on the at least one infrastructure requirement and the computing environment design topology, and sending a graphical user interface representation of the list of the at least one computing resource offering based on the at least one infrastructure requirement and the computing environment design topology indicating appropriateness for the request.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
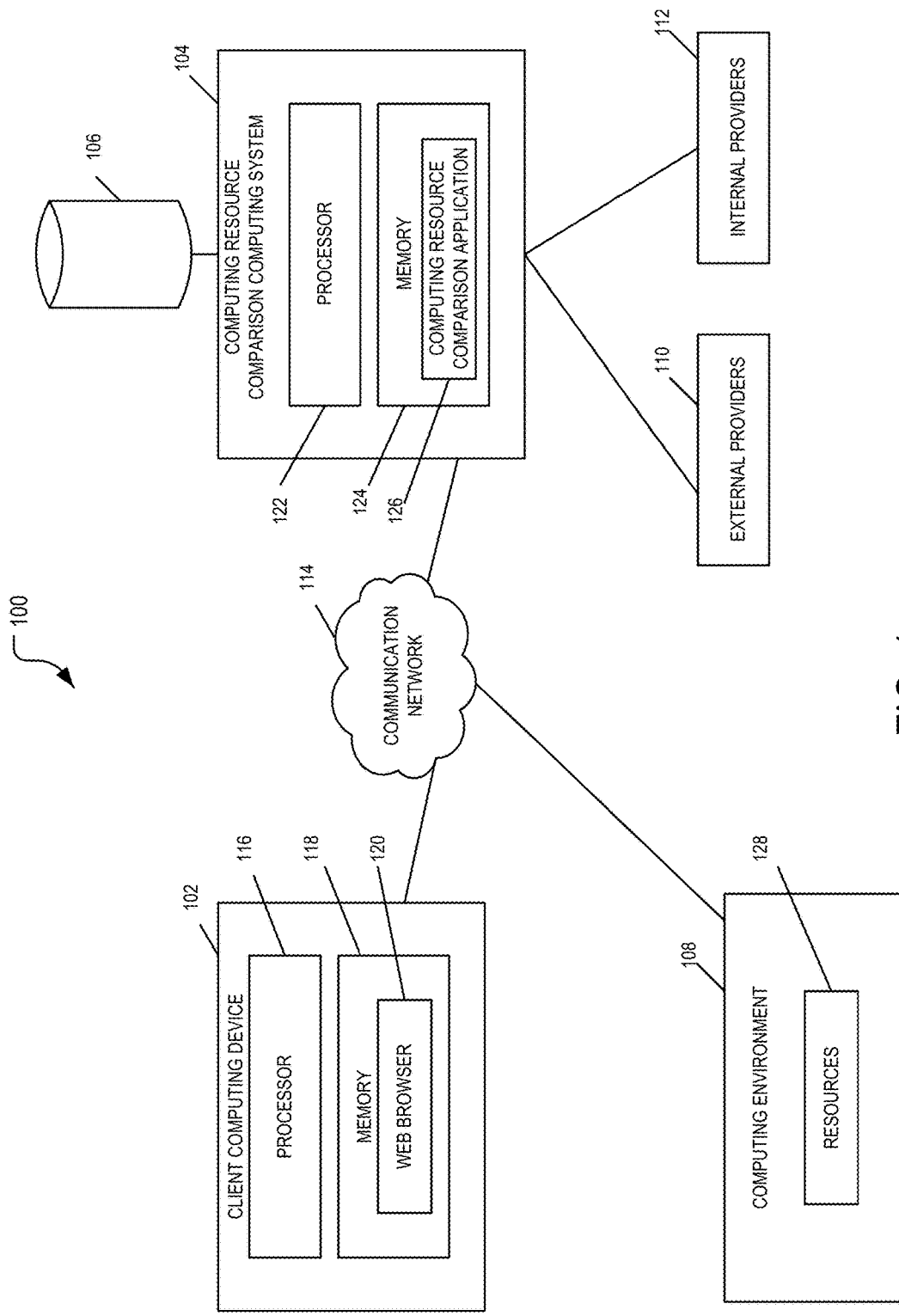
FIG. 1 illustrates an example system for comparing computing resource offerings including a computing resource comparison computing system according to one embodiment of the present disclosure.

Embodiments of the present disclosure provide a system comparing disparate resource offerings for a computing system that runs workloads, web sites, and/or software applications used by an enterprise, and then providing a recommendation or other information as to which of the compared offerings are suitable or preferred for some compute project, service, or the like. The disparate resources may be resources provided by a plurality of computing resource providers including cloud computing providers. The cloud computing providers may provide services including storage as a service, infrastructure as a service, platform as a service, and other services. The system compares disparate computing resource offerings based on a number of policy based comparison points. The comparison points may be related to current or desired workload performance, availability, configuration, cost, compliance, and/or security. The comparison points may be user defined and may allow direct comparison between the disparate computing resources provided by one or more providers. The computing resources may be assigned tags and/or metadata that define their compute, network, storage, and software virtualization attributes that may be consumed, extracted, transformed, and loaded from the cloud computing providers via one or more provider application program interface (API) calls. The system compares the available offerings based on performance, availability, configuration, cost, compliance, and/or security, and may provide recommendations based on the comparisons.

As an example, a first cloud provider providing a first computing infrastructure resource (e.g., a first virtual server) may be more appropriate for a particular email application workload than a second cloud provider providing a second computing infrastructure resource (e.g., a second virtual server) even though it has a higher monthly cost because the first cloud provider is more appropriate than the second cloud provider in performance and availability. Performance and availability may be indicated to be the most important comparison points by an administrator selecting the computing infrastructure resource based on policies set by the administrator. The performance, availability, configuration, cost, compliance, and/or security of each computing infrastructure resource provided by the providers being compared may be adjusted to a common scale and normalized for comparison. As an example, the first computing infrastructure resource provides more random access memory (RAM) having a higher clock speed and a higher transfer rate resulting in a higher performance. Additionally, the first computing infrastructure resource provides flash storage whereas the second computing infrastructure resource provides traditional mechanical hard disk drive storage. The flash storage provides much faster read/write speeds resulting in a higher performance and also has a lower failure rate resulting in a higher availability. Thus, in this case, the higher cost of the first computing infrastructure resource is outweighed by the benefits related to performance and availability.

The system may include a web server that utilizes a web application framework to support a dynamic website and/or a web application. The web server deploys and runs JavaServer Pages (JSP), Active Server Pages (ASP), ASP.NET pages, PHP pages, and/or other types of pages that include server-side code, applications, or scripts and/or client-side code, applications or scripts that interact with a user using a client computing device. The web server dynamically generates web pages for comparing the computing resource offerings from the one or more providers. A client computing device transmits a request to the web server that compares the computing resource offerings. Next, the web server transmits a response comprising the dynamically generated web pages for comparing computing resource offerings. As a result, a user of the client computing device may select and order one or more of the computing resource offerings based on the comparisons.

This solution provides central information technology (IT) users with a way to compare disparate computing resource offerings based on current or desired workload performance, availability, configuration, cost, compliance, and/or security and ensure that just the right amount of infrastructure is purchased, provisioned, and made consumable just in time. Conventionally, central IT users made non-appropriate purchases. The users overprovision computing resources and/or underprovision computing resources. When computing resources are overprovisioned, the resources may sit idle, unutilized and cost more than required for one or more associated workloads. When computing resources are underprovisioned, the additional resources may be purchased too late and/or be overburdened resulting in a failure to meet a service level agreement (SLA) or worse.

An enterprise, such as a corporation, a professional organization, a government agency, a university, or a data center operator, may order any number of computing resources to fulfill some computing need such as running one or more software applications, hosting one or more websites, providing a network connection, and storing data, among others. The computing resources may be ordered and managed by an administrator, e.g., the central IT user. The central IT user may have the responsibility of enabling computing resources for consumption by business users, e.g., end consumers, employees of a company, students and faculty of a university, and application developers of the enterprise. The application developers may manage software applications for the enterprise. As an example, the central IT user may be responsible for supplying an email system and other productivity applications for a corporation of five hundred employees. The central IT user may have the ability to create, review, add, change, and delete objects, policies, and service offerings used to power the email system and the other productivity applications provided by the computing system. In the present example system, computing resources that are compared, may be ordered, added or upgraded, or the like, and are referred to as objects and compared in the system as objects.

The computing resources may be one or more objects comprising an atomic computing device, a converged computing device, and/or an abstracted computing device. As an example, an object may be a blade server, a storage array, a firewall, a load balancer, and/or a software application among other objects. An object also may be an abstraction of a group of objects, e.g., a storage pool comprising a plurality of storage devices. An object model may include a description of interrelationships between objects. The object model may be used to define relationships between objects for a particular computing environment or computing resource, e.g., a computing environment includes object A, object B, and object C. Object A comprises objects D, E, and F. Object B comprises objects G, H, and I. As an example, Object C may not be built until object A is completed. Object C comprises objects J, K, and L.

The object model is used to standardize mapping of objects to component configurations. As an example, the object model may comply with or be based on Topology and Orchestration Specification for Cloud Applications (TOSCA). TOSCA enables interoperable description of application and infrastructure cloud services, enables the relationships between the parts of the services, and enables the operational behavior of the services including deploy, patch, and shutdown. The description is designed to be independent of any supplier providing the objects or services. In other words, the object model describes any number of possible computing resources as unique objects in a standardized way. The computing system may be described in a standardized way using the object model comprising any number of objects representative of the various resources forming the computing system.

The comparison points may be based on policies and apply constraints to the computing system. The policies may be created or defined by the administrator or central IT user. The policies may be related to performance, availability, configuration, cost, compliance, and/or security. As an example, there may be location based policies, availability based policies, compliance based policies, performance based policies, and other types of policies. There may be policies related to physically locating the hardware in a particular location in the world, e.g., US East, US West, EU, Asia Pacific, and South America. There may be policies related to availability of the computing system, e.g., 99.999% or five nines, 99.99% or four nines, 99.9% or three nines, and 99% or two nines. There may be policies related to specific types of compliance, e.g., PCI (Payment Card Industry Data Security Standard), PII (Personally identifiable information), HIPAA (Health Insurance Portability and Accountability Act). There may be policies related to performance of the computing system including high performance, mid-range performance, and economy performance. In addition, there may be other policies related to computing systems having specific features including hardware configurations such as flash based storage or software configurations such as network virtualization software such as VMWare NSX™.

In many instances, an order, upgrade to an order, or modification to an order for computing resources takes a significant amount of time to fulfill or complete. Generally, according to an example embodiment, an order process for a new computing environment may take forty-five to sixty days to complete from start to finish in a relatively fast and efficient setting, and often takes much longer; however, upgrades or modifications may take less or more time. In the past, an order process may have taken six months, a year, eighteen months, or even longer to complete. Conventionally, the central IT user may have selected computing resources based on cost, familiarity, recommendations from colleagues, or self-serving recommendations or comparisons directly provided by computing resource providers. Because of the time it takes to order computing resources, it is important that the computing resources be appropriate for the task at hand based on the policies. However, the user is unable to easily compare computing resource offerings from different providers and determine appropriate resources for a particular workload, web site, or software application for the enterprise. According to an example embodiment, the system compares disparate computing resource offerings based on a number of policy based comparison points.

For example, when a particular workload runs on an existing computing environment physically inside a data center provided by the enterprise, the computing environment may analyze usage information provided by one or more objects of the computing environment. This usage information may include, for example, a version number of a server, a RAID (redundant array of independent disks) level configuration of a storage array, a release certification matrix (RCM) score, and an overall performance of the computing environment. Using this usage information, the system may search known cloud computing resource offerings and determine one or more matching computing resource offerings based on a configuration of the existing computing environment. If a particular computing resource offering matches the configuration of the existing computing environment, then this particular computing resource offering may be ranked higher than other computing resource offerings that only partially match the configuration of the existing computing environment. As another example, when a particular workload is a new workload that has not yet been provisioned, the system may search known cloud computing resource offerings and determine one or more matching computing resource offerings based on a design of a new computing environment. If a particular computing resource offering matches the design of the new computing environment, then this particular computing resource offering may be ranked higher than other computing resource offerings that only partially match the design of the new computing environment.

FIG. 1 illustrates an example system for comparing computing resource offerings 100 according to teachings of the present disclosure. The system for comparing computing resource offerings 100 compares computing resources from one or more different providers. The comparisons may be policy based comparisons based on comparison points associated with performance, availability, configuration, cost, compliance, security, and others. The system for comparing computing resource offerings 100 may be a component provided by a cloud management and brokerage portal. The portal provides an administrator and other users with comparisons of available computing resource offerings from a plurality of cloud and remote computing service providers. The comparisons of computing infrastructure provided by the plurality of cloud and remote computing service providers are based on the object model that defines the computing resources, a policy engine that enforces rules of consumption, configuration, and provisioning of the computing resources, and a state engine that applies policies to the computing resources when they are in use.

According to an aspect of the present disclosure, the system for comparing computing resource offerings 100 includes a client computing device 102 and a computing resource comparison computing system 104 that compares the computing resources from the different providers. Using the computing resource comparison computing system 104, a user may compare, order, upgrade, and/or modify computing infrastructure of a computing environment 108. The system 100 further comprises a data source 106 that may be one or more databases comprising an organized collection of data for the system for comparing computing resource offerings 100. The one or more databases may store data in one or more tables and be managed by a database management system (DBMS) including a relational DBMS, and other types of DBMSs.

The data source 106 stores one or more order summary files including order summary information, computing environment current usage and utilization information (if currently in use), computing environment projected usage and utilization information. The data source 106 also stores computing resource description information of available computing resources and comparison information that includes comparisons of one or more objects for the computing environment 108. When the central IT user begins a new order for the computing environment 108, an order summary file or another data structure may be created and stored in the data source 106 including a list of one or more computing components of the computing environment 108. The new order may be assigned a unique order identifier for referencing the one or more computing components of the computing environment 108. The order summary file may be modified when changes, modifications, or upgrades are made to the computing environment 108.

Nevertheless, the data source 106 may store any suitable type of information for comparing different computing resources for the computing environment 108. Although the data source 106 is shown as being located on, at, or within the computing resource comparison computing system 104, it is contemplated that the data source 106 can be located remotely from the computing resource comparison computing system 104, such as on, at, or within a memory of a host or virtual object of the computing environment 108.

The computing resource comparison computing system 104 projects usage of the computing environment 108 and monitors current usage of the computing environment 108. The computing resource comparison computing system 104 may receive usage information indicating usage of the computing environment 108 and other computing environments using VCE VISION INTELLIGENT OPERATIONS™ or another software analytics package provided by GOOGLE™ Cloud Platform, AMAZON™ Web Services or others. VCE VISION INTELLIGENT OPERATIONS™ is a software application executed by the computing environment 108 or another computing device that provides a continuous, real-time perspective of compute, network, storage, and virtualization resources of the computing environment 108. The projected usage may be based on usage of the computing environment 108 and/or anonymous usage information associated with other computing environments.

The computing resource comparison computing system 104 includes a computing resource comparison application 126. The computing resource comparison application 126 communicates with external providers 110 and internal providers 112 to establish a list of available computing components and/or modifications for the computing environment 108 based on the comparison points and the usage information. The external providers 110 may provide public cloud computing offerings including software offerings, hardware offerings, and other computing service offerings and the internal providers 112 may provide private cloud computing offerings including software offerings, hardware offerings, and other computing service offerings. The central IT user may manage the public cloud computing offerings, the private cloud computing offerings, and the other computing service offerings comprising the computing environment 108 for the enterprise and the employees of the enterprise. As an example, the computing resource comparison application 126 may send provider application program interface (API) calls to the external providers 110 and the internal providers 112. The API calls may include authentication information that identifies the central IT user or enterprise. As an example, the computing resource comparison application 126 may send an API call to AMAZON™ Web Services (AWS™) that identifies the enterprise. The data source 106 may store authentication information for sending API calls to the external providers 110 and/or the internal providers 112 (e.g., unique identifiers or keys) and may store or cache a list of available computing components and/or modifications available for ordering for the computing environment 108 that are selectable and configurable using the portal.

The client computing device 102 and the computing resource comparison computing system 104 communicate with one another using a communications network 114. Nevertheless, the client computing device 102 and the computing resource comparison computing system 104 may communicate with one another in any suitable manner. For example, the client computing device 102 and the computing resource comparison computing system 104 communicate with each other using wireless, wired, and/or optical communications. In one specific embodiment, the client computing device 102 and the computing resource comparison computing system 104 communicate with one another using the communication network 114, such as the Internet, an intranet, or other wired and/or wireless communication networks. In another embodiment, the client computing device 102 and the computing resource comparison computing system 104 communicate using any suitable protocol or messaging scheme.

As an example, the client computing system 102 and the computing resource comparison computing system 104 communicate data in packets, messages, or other communications using a common protocol, e.g., Hypertext Transfer Protocol (HTTP) and/or Hypertext Transfer Protocol Secure (HTTPS). The computing devices of the system 100 may communicate based on representational state transfer (REST) and/or Simple Object Access Protocol (SOAP). As an example, a first computer (e.g., the client computing device 102) may send a request message that is a REST and/or a SOAP request formatted using Javascript Object Notation (JSON) and/or Extensible Markup Language (XML). In response to the request message, a second computer (e.g., the computing resource comparison computing system 104) may transmit a REST and/or SOAP response formatted using JSON and/or XML. The systems may communicate without the use of a separate or a distinct network. Embodiments contemplate that the modules employed by the computing resource comparison application 126 are executed by a computing device, discussed below.

In one example, the client computing device 102 transmits a request for computing resource offerings for the computing environment 108 to the computing resource comparison application 126 of the computing resource comparison computing system 104. The request is a request for available computing components and services for the computing environment 108. The computing resource comparison application 126 of the computing resource comparison computing system 104 receives the request from the client computing device 102. The request may include a unique order identifier that corresponds with the computing environment 108. The computing resource comparison application 126 sends one or more provider API calls to the external providers 110 and the internal providers 112, determines available computing resource offerings, and compares the available computing resource offerings. The comparison of the available computing resource offerings may be based on the comparison points and usage data for the computing environment 108 and other computing environments stored in the data source 106. In one example, the computing resource comparison application 126 determines the available computing resource offerings that correspond with the comparison points and may rank and/or rate the available computing resource offerings based on the comparison points in addition to other criteria. The computing environment 108 may be the email system and comprise MICROSOFT™ Exchange servers to be provided by internal providers 112 and one or more web servers to be provided by external providers 110. These servers may be physical servers and/or virtual servers.

If the computing environment is in use, the computing resource comparison application 126 determines a current usage of the computing environment 108, projects future usage of the computing environment 108 based on the current usage and the past usage based on a change in utilization over a period of time, determines available computing resources for modifying the computing environment 108, and compares the available computing resources based on the comparison points. If the computing environment is not yet in use, the computing resource comparison application 126 projects future usage of the computing environment based on usage data from the other computing environments stored in the data source 106, determines available computing resources for the computing environment, and compares the available computing resources based on the comparison points.

As an example, the computing environment 108 may be the email system and comprise MICROSOFT™ Exchange servers provided by internal providers 112 and one or more web servers provided by external providers 110. The external providers 110 may include third-party providers that provide computing resources and services. The services may include infrastructure as a service, platform as a service, or software as a service. As an example, the services may include a collection of remote computing services including AMAZON™ Web Services (AWS™), VMware vCloud™ Air, RACKSPACE™, MICROSOFT AZURE™, and other similar computing resources. The computing resource comparison application 126 may transmit one or more provider API calls and receive computing environment configuration information from one or more computers and one or more databases provided by the external providers 110. As an example, the computing resource comparison application 126 may query the data source 106 using the unique order identifier for referencing the one or more computing components and obtain information about the current computing environment configuration from the external providers 110. The internal providers 112 may include ServiceNow™, a configuration management database (CMDB), and other computing resources. The computing resource comparison application 126 may transmit one or more provider API calls and receive computing environment configuration information from one or more computers and one or more databases provided by the internal providers 112. As an example, the computing resource comparison application 126 may query the data source 106 using the unique order identifier for referencing the one or more computing components and obtain information about the current computing environment configuration from the internal providers 112. The information from the external providers 110 and the internal providers 112 may be provided via one or more user interfaces.

As an example, using the client computing device 102 or another computing device, the central IT user may search for and select from one or more service offerings using the cloud management and brokerage portal comprising a graphical user interface (GUI) indicating the available service offerings. The service offerings comprise a collection of interrelated objects provided by the external providers 110 and the internal providers 112. As an example, a service may be a single object such as a component or a backup service that may be a consumable service that is spread across multiple data centers including storage, server, and networking objects. As an example, one of the MICROSOFT Exchange servers may be overutilized and additional server capacity may be needed.

In one example, the computing resource comparison application 126 determines whether the one or more objects for the computing environment 108 are in stock or available at the external providers 110 and the internal providers 112 by sending the provider API calls. The objects may include storage components, server components, networking components, converged components, and abstracted components. Using the comparisons, the central IT user may select and order components for the computing environment 108 from the one or more service offerings. The central IT user may select an infrastructure as a service to support an upgrade of an email system and/or migrate the email system to a new computing environment. Thus, in one example, the computing environment 108 comprising the email system may be managed and upgraded by adding increased server capacity for additional users.

The computing resource comparison application 126 may be one or more servlets and one or more JSP files that perform functions on behalf of requests by the client computing device 102. The computing resource comparison application 126 determines whether the one or more objects are in stock or available for order by requesting information from the external providers 110 and the internal providers 112 via the provider API calls. As an example, the computing resource comparison application 126 executes one or more JSP files and delivers an HTML document including the representation to the client computing device 102.

The client computing device 102 may be a computer having one or more processors 116 and memory 118, including but not limited to a server, laptop, desktop, tablet computer, smartphone, or a dedicated electronic device having a processor and memory. The one or more processors 116 may process machine/computer-readable executable instructions and data, and the memory 118 may store machine/computer-readable executable instructions and data including one or more applications, including a web browser 120. The processor 116 and memory 118 are hardware. The memory 118 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The web browser 120 may be a component of an application and/or service executable by the client computing device 102. For example, the web browser 120 may be a single unit of deployable executable code. The web browser 120 may be one application and/or a suite of applications. As an example, the web browser 120 may be INTERNET EXPLORER®, SAFARI®, CHROME™, FIREFOX®, OPERA™, and other applications. The web browser 120 may be part of another native application executed by the client computing device 102 (e.g., a web view within the native application) and/or the web browser 120 may be a mobile web browser. According to an example embodiment, the web view may be embedded in a mobile application (e.g., an app) downloaded from a digital distribution application platform that allows users to browse and download applications developed with mobile software development kits (SDKs) including the App Store and GOOGLE PLAY® among others. The app may be installed on the client computing device 102, which may have an iOS operating system or an ANDROID™ operating system, among other operating systems. The web browser 120 communicates messages to the computing resource comparison computing system 104 and receives messages from the computing resource comparison computing system 104, e.g., HTTP requests and corresponding HTTP responses. The responses may comprise requested content, including information associated with the computing environment 108.

The client computing device 102 may further include an optional display and an input device. The display is used to display visual components of the web browser 120, such as at a user interface. In one example, the user interface may display a user interface of the web browser 120. The display can be a liquid-crystal display, a light-emitting diode display, an organic light-emitting diode display, a touch screen display, an e-ink display, an e-paper display, and other displays. The input device is used to interact with the web browser 120 and may include a mouse, a keyboard, a trackpad, and/or the like. The input device may be included within the display if the display is a touch screen display. The input device allows a user of the client computing device 102 to manipulate and interact with the user interface of the web browser 120.

The computing resource comparison computing system 104 may be a computer having one or more processors 122 and memory 124, including but not limited to a server, laptop, desktop, tablet computer, smartphone, or a dedicated electronic device having a processor and memory. The one or more processors 122 may process machine/computer-readable executable instructions and data, and the memory 124 may store machine/computer-readable executable instructions and data including one or more applications, including the computing resource comparison application 126. The computing resource comparison application 126 may be a web application. In addition, the computing resource comparison application 126 may provide an application program interface (API) so that other software tools can consume derived information for other purposes, such as providing comparison information and recommending computing resources for the computing environment 108 based on the comparison information. The processor 122 and memory 124 are hardware. The memory 124 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The computing environment 108 may be provided in whole or in part through a converged infrastructure. The computing environment 108 is monitored by the computing resource comparison application 126 of the computing resource comparison computing system 104. In a specific example of a computing environment 108 that includes a converged infrastructure (CI), the resources 128 may include hardware resources (e.g., hosts 206) and/or virtual resources (e.g., virtual machines 208a, virtual switches 208b, and/or virtual storage objects 208c) executed by the hosts 206 of the converged infrastructure (See FIG. 2). In this case, the CI may include thousands of physical objects that each executes tens or even hundreds of virtual objects.

The resources 128 of the computing environment 108 may represent hardware resources and/or one or more virtual objects executed on those hardware resources, which may be implemented in a virtual computing environment. The virtual computing environment may be embodied in any computing system that provides virtualized components (virtual objects) executed on one or more physical hosts. Converged infrastructures typically refer to computing systems implemented in a virtual computing environment that includes a structured combination of multiple virtual objects that are executed on independently functioning hardware resources commonly referred to as hosts. Converged infrastructures implemented in a virtual computing environment may be advantageous in that they are dynamically configurable to continually adapt to ever changing requirements typically exhibited by modern converged infrastructures. Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can be shared by multiple applications.

In another aspect, a converged infrastructure comprises a combination of converged infrastructures configured in a cloud computing environment. While some examples disclosed herein reference converged infrastructures, also sometimes referred to as unified computing systems, fabric-based computing systems, and dynamic infrastructures, systems and method described herein may be applied to other computing environments 108.

Resources 128 of a converged infrastructure may include resources, such as data processing devices, data storage devices, servers, networking equipment, and/or other computing devices. A converged infrastructure includes a combination of these devices that are packaged and interconnected in a standardized manner for ease of maintenance and use. For example, a converged infrastructure 200 such as that shown in FIG. 2 includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing environment, such as a computer cluster, computing grid, blade array, and/or other computing infrastructure may be upgraded using the teachings of the present disclosure.

Figure 2A:
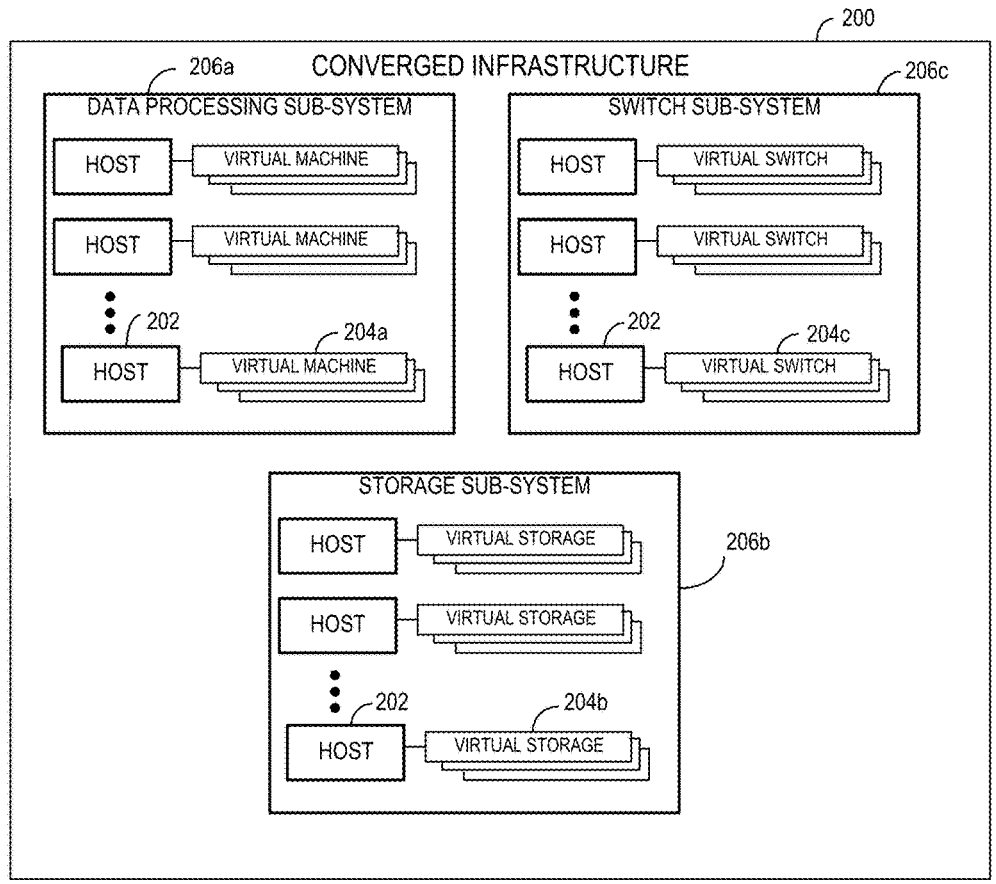
FIGS. 2A and 2B illustrate an example converged infrastructure that may be in communication with the system for comparing computing resource offerings according to one embodiment of the present disclosure.

FIG. 2A illustrates an example converged infrastructure 200 that may be implemented as the computing environment 108 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is located in Palo Alto, Calif.

Figure 2B:
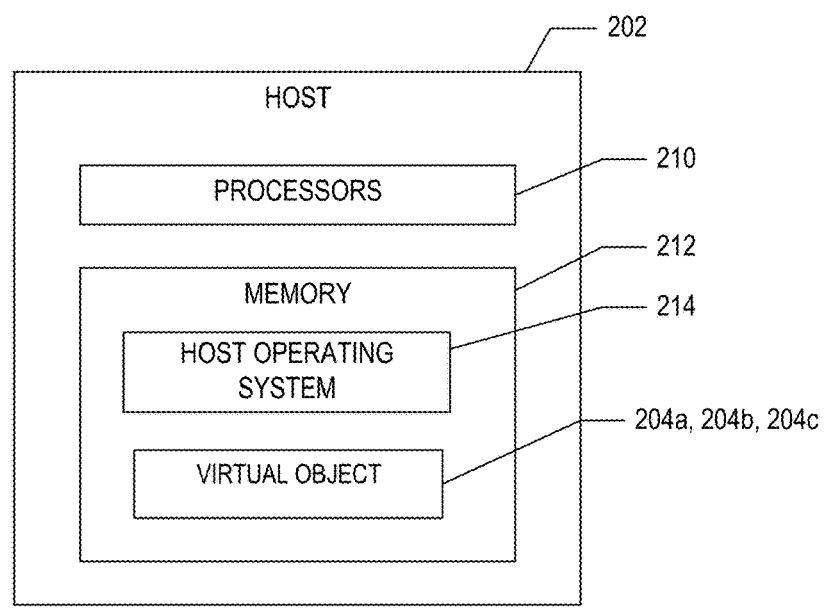

FIG. 2B illustrates an example host 202 implemented on each converged infrastructure 200 according to one aspect of the system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as a blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 214 controls and manages the operation of the virtual objects executed on the host 202. For example, control signaling for starting, stopping, and/or changing operating parameters of each virtual object is managed through the host operating system 214.

Figure 3:
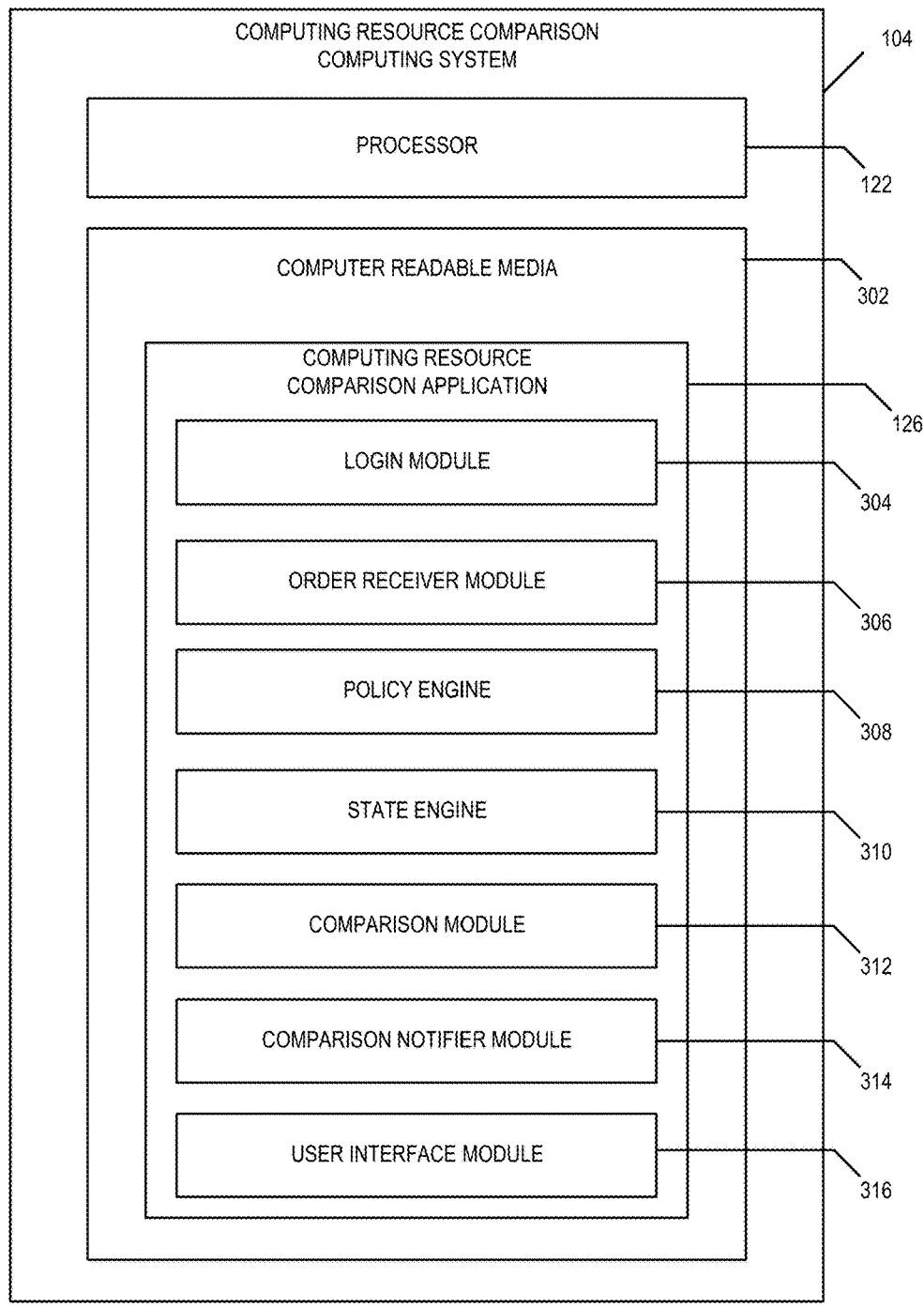
FIG. 3 illustrates a block diagram of an example computing resource comparison application executed by the system for comparing computing resource offerings according to one embodiment of the present disclosure.

FIG. 3 illustrates a block diagram of the computing resource comparison application 126 of the computing resource comparison computing system 104 according to an example embodiment. The computing resource comparison computing system 104 includes computer readable media (CRM) 302 on which the computing resource comparison application 126 is stored. The computer readable media 302 may include volatile media, nonvolatile media, removable media, non-removable media, and/or another available medium that can be accessed by the processor 122. By way of example and not limitation, the computer readable media 302 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, for example.

The computing resource comparison application 126 includes a login module 304 that receives login information sent from the client computing device 102. The login module 304 may be in communication with a user interface module 316 (described below) that generates a user interface for receiving the login information from the client computing device 102. The login information may include a representation of a username and a password. The username and password may be encrypted by the client computing device 102 using transport layer security (TLS), secure sockets layer (SSL), and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the computing resource comparison computing system 104 or another computing system without directly sending the username and password to the computing resource comparison computing system 104 or another computing system via the communications network 114.

If the login information is not valid, the login module 304 transmits an error message to the client computing device 102. However, if the login information is valid, the login module 304 transmits a portal user interface to the client computing device 102. An example user interface is shown in FIGS. 5A-5E. As an example, the login module 304 transmits resources and user interface elements to generate a web page for comparing disparate computing resources to the client computing device 102.

The computing resource comparison application 126 further includes an order receiver module 306 that receives the request for comparing disparate computing resources for the computing environment 108. The order receiver module 306 receives (1) a request to place a new order for the computing environment 108 or (2) a request to modify an existing setup, e.g., a previously placed order for the computing environment 108.

For a new order, the order receiver module 306 determines available options for the new order including searching available options for a new order from the external providers 110 and the internal providers 112, creating a new order from a template, creating a custom order, and replicating an existing order previously placed, e.g., reconstructing an order from an order history.

The user may search through a list of one or more available service offerings from the external providers 110 and the internal providers 112. As an example, each of the one or more available service offerings may be searched responsive to an alphanumeric-based search query. The order receiver module may determine whether the alphanumeric-based search query matches available service offerings from the external providers 110 and the internal providers 112 by comparing the search query with metadata describing each of the available service offerings. Each of the one or more available service offerings is assigned metadata and/or tags that describe the service offering. The metadata and/or the tags may be assigned by the external providers 110 and the internal providers 112 that define their compute, network, storage, and software virtualization attributes that may be consumed, extracted, transformed, and loaded from the computing providers via one or more provider API calls and normalized for the basis of comparison. The order receiver module 306 assigns the order with a unique order identifier for referencing the order, e.g., ABCD1234, and begins to compare available resource offerings that are appropriate for the alphanumeric-based search query. The unique order identifier is stored in the data source 106 along with the order date and/or the order time for the order.

In one aspect, a first cloud computing provider describes its offering for infrastructure as a service via an API provided by a particular internal provider 112 to include "Compute 2 GB of RAM 2CPU." A second cloud computing provider describes its offering for infrastructure as a service via an API provided by a particular external provider 110 to include "Server with 2CPU and 2 GB of RAM." A third cloud computing provider describes its offering for infrastructure as a service via an API provided by a particular external provider 110 to include "Server with 4CPU and 4 GB of RAM." The order receiver module 306 consumes, extracts, transforms, and loads these descriptions in metadata and assigns a weight that indicates how applicable the offering may be for the order. In this case, a new workload corresponding to the order and/or an extension of an existing workload may require two compute resources having 2 GB of RAM and 2 CPUs. As an example, the order receiver module 306 indicates that the first cloud computing provider and the second cloud computing provider provide offerings that are more applicable to the order than the offering provided by the third cloud computing provider. Thus, the offering provided by the first cloud computing provider and the offering provided by the second cloud computing provider most closely match or align with the order. A user would be presented with the list of offerings listed or ranked based on how closely they match or align with the order, e.g., offering two, offering one, offering three. The user may select offering two and provision offering two for use with an existing workload that requires two compute resources having 2 GB of RAM and 2 CPUs.

The templates include a list of one or more pre-created orders having a particular set of infrastructure requirements and a particular design. As an example, the user may view a list of one or more available templates and may select one of the templates. The templates may be created and saved to the data source 106 by the central IT user or another user. The order receiver module 306 assigns the order with a unique order identifier for referencing the order, e.g., ABCD1234, and begins to compare available resource offerings that are appropriate for the template. The unique order identifier is stored in the data source 106 along with the order date and/or the order time for the order.

As another example, the user may choose to create a custom order. If the user creates a custom order, the user is asked to select one or more order comparison points comprising infrastructure requirements that are policy based. The order receiver module 306 generates an infrastructure requirements interface for selecting the one or more order comparison points. The user interface module 316 presents the infrastructure requirements interface. As an example, the infrastructure requirements may be related to performance, availability, configuration, cost, compliance, and/or security. When the order is a new order from a template or from an existing order previously placed, these infrastructure requirements are obtained from the template or from the existing order.

After selecting the infrastructure requirements, the order receiver module 306 generates a topology design interface for constructing the design of the order. Again, when the order is a new order from a template or from an existing order previously placed, the design is obtained from the template or from the existing order. The user interface module 316 presents the topology design interface. An example of the topology design interface is shown in FIG. 5C. As an example, the topology design interface may be a WYSIWYG (what you see is what you get) interface. The topology design interface may include one or more design panes including a first palette pane that includes drop down selection boxes for selecting each of the components of the order and a second design pane for arranging and connecting the components of the order. As an example, the first palette pane may include one or more drop down selection boxes for selecting components for the order. A first selection box may be a virtual machine type selection box including WINDOWS® and LINUX®, a second selection box may be an application type selection box including APACHE®, Web, Exchange, SQL, a third selection box may be a storage type selection box including NFS (Network File System), CIFS (Common Internet File System), Block Storage, Object Storage, and a fourth selection box may be a Network/Security selection box including FW (Firewall), LB (Load Balancer), IDS (Intrusion Detection System), VXLAN (Virtual Extensible LAN), and VLAN (Virtual LAN) Seg. Components may be dragged from the first palette pane to the second design pane and arranged and connected with one another to create a particular design topology for the order. After the user configures the particular design topology, e.g., a logical visual representation of the order, the order receiver module 306 stores a representation of the order as a collection of objects and may assign a unique order identifier to describe the collection of the objects. After the user selects the infrastructure requirements and provides the design of the order, the order receiver module 306 requests that the user confirm a final configuration for the order. The collection of objects may be used to compare infrastructure requirements associated with the computing environment 108 to known cloud computing provider offerings collected via one or more provider APIs from external providers 110 and internal providers 112. In one aspect, a user indicates that the particular design topology includes hardware and/or software associated with a MICROSOFT EXCHANGE server including a FW, Block Storage, and ten VLANs. The comparison determination module 312 receives this information and uses the information to rank available offerings using a weighted algorithm based on best match. If a known cloud computing provider provides an offering that meets each aspect of the infrastructure requirements and the particular design topology, this offering would be ranked highest. Other offerings provided by the cloud computing providers would be ranked based on how well their components match the infrastructure requirements and the particular design topology. As an example, if another offering includes Block flash storage rather than Block storage, the other offering may be ranked lower. An additional offering that includes FW and ten VLANs, but includes Object Storage may be ranked even lower.

Once the user accepts the final configuration, the order receiver module 306 assigns the order with the unique order identifier for referencing the order, e.g., ABCD1234, and begins to compare available resource offerings that are appropriate. The unique order identifier is stored in the data source 106 along with the order date and/or the order time for the order. The user may decide to save any custom order as a template. The custom order is added to the list of one or more templates.

The order receiver module 306 may query a list of one or more existing orders previously placed having a particular set of infrastructure requirements and a particular design. As an example, the user may view a list of one or more existing orders previously placed and may select one of the existing orders previously placed. The order receiver module 306 assigns the order with a unique order identifier for referencing the order, e.g., ABCD1234, and begins to compare available resource offerings that are appropriate for the selected order. The unique order identifier is stored in the data source 106 along with the order date and/or the order time for the order.

For a previously placed order, the order receiver module 306 receives the unique order identifier for referencing the order. The order receiver module 306 obtains usage report information for the computing environment 108. The usage report information may be one or more usage reports stored in the data source 106. The usage report may be a report regarding usage of the computing environment 108 provided by VCE VISION™ or another software analytics package. As an example, the usage report may be based on analytics information from the external providers 110 and/or the internal providers via analytics API calls. The usage report may include a list of one or more objects of the computing environment 108, a current overall utilization percentage of the computing environment 108, a utilization percentage of each of the one or more objects of the computing environment 108, and a recommended utilization percentage of each of the one or more objects of the computing environment 108, among other information. The user may review infrastructure requirements that were provided when the order was placed and modify the infrastructure requirements. The user also may review design of the order that was provided when the order was placed and modify the design of the order.

The computing resource comparison application 126 further includes a policy engine 308 that comprises a rules engine that leverages and enforces rules of consumption, configuration, instantiation, and provisioning for the computing environment 108. The rules may be related to the comparison points including current or desired workload performance, availability, configuration, cost, compliance, and/or security. The rules may further be related to role based access for users of the computing environment and the taxonomy or configuration of the computing environment. The policy engine 308 may apply one or more hierarchical levels of rules. As an example, the central IT user may have a general set of policies and the user ordering the order may have more specific policies that are tailored to comparison points for the specific computing environment.

As an example, a policy may comprise one or more rules based on a goal of maintaining 99.999% (five nines) availability and reliability for the computing environment 108. This policy may be set by the administrator of the enterprise. As another example, a policy may comprise one or more rules to configure the computing environment 108 with internal providers 110 rather than external providers 112. As an even further example, a policy may comprise one or more rules to configure the computing environment 108 with providers having a high rating. The rating may be provided by the administrator and/or the employees. These policies may be used to populate a bill of materials for the computing environment 108. As an example, although a software developer for the enterprise would prefer to order a single server, the availability policy or rule set by the administrator of the enterprise may only allow the software developer to order two servers that are geographically located a particular distance from one another. The rules may be based on a specified service level agreement (SLA) parameter or other factors. The policy engine 308 is used by the computing resource comparison application 126 to compare disparate computing resources for the computing environment 108. If available computing resources do not meet the policies, they may not be compared. Additionally, the available computing resources that meet the policies may be ranked, scored, and/or compared based on the policies. Policies provided by the policy engine 308 may be applied to each object currently comprising the computing environment 108 and objects to be ordered for the computing environment 108. The policy engine 308 may validate each object of the computing environment 108 by receiving a representation of the object according to the object model. Thus, the object model is validated against each rule of the policy engine 308.

The computing resource comparison application 126 further includes a state engine 310 that applies the various policies for the computing environment 108 while the computing environment 108 is in use. The state engine 310 is used to provide a quality of service related to security or performance while the computing environment 108 is in use. As an example, one of the policies may be related to security of the computing environment that provides the email system while in use. Another policy may be one or more rules related to increases in overall utilization of the computing environment 108 or utilization of one object of the computing environment 108. A further policy may be one or more rules related to ensuring that the computing environment 108 is configured for high level performance. These rules may dynamically adjust the computing environment 108 to scale based on the current utilization. As an example, the computing environment 108 may utilize more virtual servers when demand is greater and utilize fewer virtual servers when demand is lessened. The state engine 310 receives realtime information and data including the usage report information and ensures that the computing environment meets the policy rules established by the policy engine 308.

The computing resource comparison application 126 includes a comparison determination module 312 that receives the request to place the new order or the request to modify the existing setup, uses the policy engine 308 and the state engine 310, and provides comparisons of components for the computing environment 108 by normalizing, ranking, scoring, and/or comparing the components for the computing environment 108 based on the policies including the comparison points. The comparison determination module 312 may generate a list of available and appropriate computing components that comply with general policies and the infrastructure requirements, are appropriate for the design of the order, and, if applicable, are based on usage report information. The list of available and appropriate computing components and offerings may be determined by consuming and analyzing the metadata and/or the tags assigned by the external providers 110 and the internal providers 112 that define their compute, network, storage, and software virtualization attributes. The metadata and/or the tags may be consumed, extracted, transformed, and loaded from the computing providers via the one or more provider API calls. As an example, the policy engine 308 may specify that certain computing components of the computing environment 108 may only be provided by internal providers 112. As another example, the state engine 310 may specify a maximum overall utilization for processor load of the computing environment 108. The comparison determination module 312 sends one or more provider API calls to the external providers 110 and the internal providers 112 and based on the on the general policies, infrastructure requirements, the design of the order, and the usage report information, generates the list of one or more available offerings from one or more computing resource providers, e.g., the external providers 110 and the internal providers 112.

New Order

As an example, if there is a request to place a new order, the comparison determination module 312 may compare infrastructure requirements of the new order with the available offerings from one or more computing resource providers. The new order may have infrastructure compliance requirements or constraints including PCI Compliance Level 1, Pa (Personal Identifiable Information) Standard Company Policies, Location (US, UK, or Ireland), and HIPAA requirements. The comparison determination module 312 normalizes each of the available offerings from the one or more computing resource providers based on the infrastructure compliance requirements or constraints and compares each of the available offerings from the one or more computing resource providers. According to a location based constraint example, there may be three available offerings from known cloud computing providers including a first infrastructure as a service offering from an external provider 110, Amazon AWS located in European Union Availability Zone, a second infrastructure as a service offering from an internal provider 112, a VBLOCK, located in Dallas, Tex., and a third infrastructure as a service offering from the internal provider 112, a VBLOCK, located in the European Union in Cork, Ireland. In this example, the request for a new order may indicate that the associated workload utilizes MICROSOFT EXCHANGE and has a location based constraint. The location based constraint requires that the offering be physically located in the European Union and adhere to European Union Personal Identifiable Information (PII) Standard Company Policies. The list of the one or more available service offerings may be ordered or ranked based on the adherence and/or compliance with policies and constraints in addition to infrastructure requirements, appropriateness for the design of the order, and/or on usage report information. In this example, the Amazon AWS located in European Availability Zone and the VBLOCK located in the European Union in Cork, Ireland would be presented as appropriate selections for the MICROSOFT EXCHANGE workload and ranked based on the infrastructure requirements, appropriateness for the design of the order, and/or the usage report information. The usage report information may be from other computing environments that are currently in use and may be anonymous. Each of the service offerings in the list may include a name, a location, a rating, optional comments provided by the central IT user, a monthly price, an estimated deployment time, among other information.

As an example, the comparison module 312 receives the unique order identifier from the client computing device 102, queries the data source 106 for report usage information associated with the computing environment 108 identified by the unique order identifier, and determines a current usage for the computing environment 108 based on the unique order identifier and usage report information that may be stored in the data source 106. The comparison module 312 or another computing device or software application determines an estimated future usage for the computing environment based on past usage and an estimated growth in utilization, and receives available stock and availability information for additional computing resources from the external providers 110 and the internal providers 112.

If the usage report information is available, a computing resource comparison may be based on current and projected utilization that may be related to physical usage or consumption and utilization percentage or consumption. As an example, each object of the computing environment 108 may have a physical usage and a utilization percentage. A server or another computing device may have one or more processors, e.g., central processing units (CPUs) and/or graphics processing units (GPUs), having a particular processor speed and/or a number of processing cores. Each processor may have a utilization percentage and may be shared by one or more applications of the enterprise. As an example, a particular CPU may have an average load or utilization of 25%.

The server or another computing device also may have a particular amount of random access memory (RAM). The RAM may have a utilization percentage and may be shared by the one or more applications of the enterprise. As an example, a particular block of RAM may be 25% used and 75% may be available and/or free. If the RAM is overutilized, the RAM may swap portions of the RAM into non-transitory storage resulting in thrashing and underperformance.

A networking device may have a physical number of ports, e.g., ten, and each port may have a utilization percentage, e.g., a ratio of current network traffic to the maximum amount of traffic that the port can handle provided by the policy engine 308 and the state engine 310. As an example, the utilization percentage may be 50%.

A storage device or a storage array may have a particular physical amount of storage space, e.g., fifteen terabytes, in addition to a utilization percentage. The storage device may include seven terabytes of stored information and thus is approximately 7/15 full. The storage device utilization percentage may be responsive to a maximum input/output operations per second (IOPS) and a percentage of maximum IOPS provided by the policy engine 308 and the state engine 310.

In other words, each utilization metric for the computing environment 108 may be based on a performance metric associated with and specific to the object provided by the policy engine 308 and the state engine 310.

Modify Existing Setup

For the previously placed order, the order receiver module 306 may modify the infrastructure requirements and/or may view a list of one or more available resource offerings that correspond with the infrastructure requirements. The list of one or more available resource offerings may be different than the list provided when the order was placed because of changes made to the infrastructure requirements and/or resource offerings that were not available at the time of the order. Based on usage report information, the infrastructure requirements, and the design of the order, the computing resource comparison application 126 may determine whether the computing environment 108 is meeting policies based on performance, availability, configuration, cost, compliance, and/or security.

The central IT user or another user may obtain information about the one or more current computing environments 108 being managed. The user may request that VCE VISION analyze each computing environment being managed and/or may request that VCE VISION analyze the computing environments that correspond with specific infrastructure requirements. The user may modify one or more of the components of each computing environment being managed. As an example, the user may request computing environments and/or available resource offerings having an object meeting a specific set of infrastructure requirements or rules. The comparison module 312 discovers each of the computing environments meeting specific infrastructure requirements and may find a specific computing environment.

This specific computing environment may have compute resources including two type A blade servers and one type B blade server in addition to other computing components. The user may create a new rule called "Big and Fast Storage for Company A" that runs a query to find one or more computing environments and/or available resource offerings having storage arrays physically associated with "US East," having a storage size greater than 75,000 gigabytes, and having an IOPS greater than 6,000. The comparison module 312 may send one or more provider API calls to the external providers 112 and the internal providers and use the new rule to find one or more available resource offerings that would meet this rule. The comparison module 312 generates a list of one or more available resource offerings that would meet this rule. The user may select an option in the list of the one or more available resource offerings to modify the computing environment 108. As an example, one of the objects in the list of the one or more available resource offerings may be added to the computing environment or substituted with another object in the computing environment 108.

As an even further embodiment, the user may create a rule that runs a query that does not find any available appropriate resource offerings. In this case, the comparison module 312 may create a custom object that is based on one or more available resource offerings that when combined, become appropriate.

The computing resource comparison application 126 further includes a comparison notifier module 314 that transmits a message to the client computing device 102 including information regarding the list of available computing components that comply with general policies and the infrastructure requirements, are appropriate for the design of the order, and, if applicable, are based on usage report information. For each of the available computing components, the information may include a name, a location, a rating, optional comments provided by the central IT user, a monthly price, and an estimated deployment time. The message may be sent when a request to place a new order or a request to modify an existing setup is received from the client computing device 102. The message may be sent in response to a properly formatted comparison application programming interface (API) request for the list from the client computing device 102. The message also may be pushed to the client computing device 102.

The central IT user may receive the message and may request that the comparison notifier module 314 automatically remind the central IT user at a particular time, e.g., two months, to perform another comparison. As an example, the reminder may be sent via email, push notification, or using another type of reminder.

In additional embodiments, the comparison notifier module 314 may push comparisons that may have available offerings from one or more computing resource providers to the client computing device 102. As an example, the client computing device 102 may request that comparisons be provided once a week, every other week, at another time interval, and/or when a certain event occurs, e.g., a reorder point is coming soon. Push updates may be scheduled by the central IT user using the client computing device 102 or another computing device using the portal. The comparison notifier 314 may send the available offerings from one or more computing resource providers to the client computing device 102. As an example, the comparison notifier 314 may send this information to an email address associated with the central IT user or another email address. The email may include a uniform resource locator (URL) that when selected directs the central IT user to the portal to display the available offerings from one or more computing resource providers via the web browser 120. As an example concerning cost, a user may create a custom notification using the comparison notifier 314. The custom notification may be associated with one or more objects associated with cloud computing providers that meet requirements. The user may create the custom notification using the web browser 120. In one aspect, the custom notification may send a push notification to the client computing device 102 and/or another computing device when the cost of cloud computing reaches or exceeds $0.02 per compute hour on AWS (an external provider 110) and is less than $0.02 on a VBLOCK (an internal provider 112). The push notification may include a payload and/or a message that indicates that resources should be moved from one known cloud computing provider to another cloud computing provider at a current time or by a certain time to save on costs, e.g., move resources from an external provider 110 to an internal provider 112.

Additionally, the computing resource comparison application 126 includes a user interface module 316 that generates a user interface of the computing resource comparison application 126. The user interface module 316 may generate a native and/or web-based graphical user interface (GUI) that accepts input and provides output. The user interface module 316 may send data to other modules of the computing resource comparison application 126 and receive data from other modules of the computing resource comparison application 126. As an example, the user interface module 316 transmits data and resources to the client computing device 102 and visually generates the user interface shown in FIGS. 5A-5E.

It should be appreciated that the modules described herein are provided only as examples, and that the computing resource comparison application 126 may have different modules, additional modules, or fewer modules than those described herein. For example, one or more modules as described in FIG. 3 may be combined into a single module. As another example, certain modules described herein may be encoded on, and executed on other computing systems, such as on one of the hosts 202 of a converged infrastructure 200 as described above with reference to FIGS. 2A and 2B.

Figure 4:
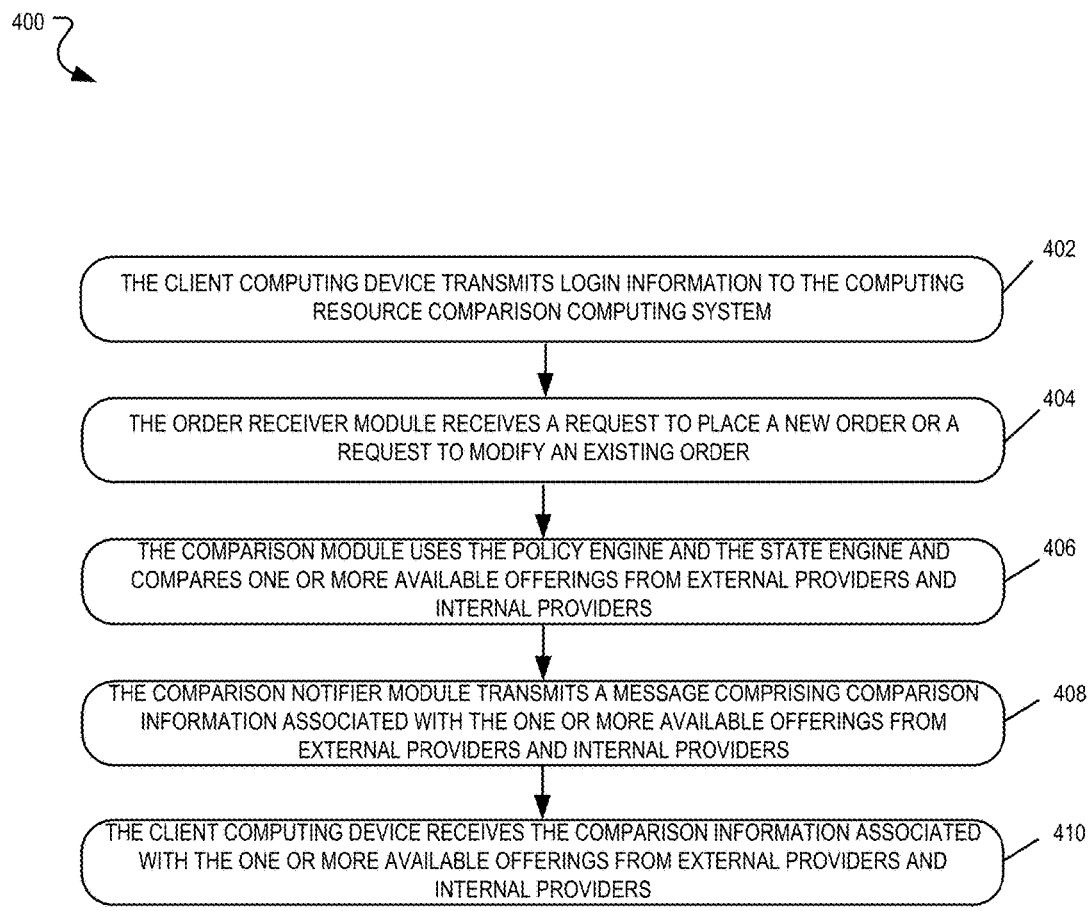
FIG. 4 illustrates an example process performed by the computing resource comparison application according to one embodiment of the present disclosure.

FIG. 4 illustrates a flowchart of a process 400 for comparing disparate computer resource offerings for the computing environment 108 according to an example embodiment. The process 400 shown in FIG. 4 begins in step 402. In step 402, the client computing device 102 transmits login information to the login module 304 of the computing resource comparison application 126 of the computing resource comparison computing system 104. The login information may include username information and password information, among other information. The login module 304 verifies that the login information is valid. If the login information is not valid, the login module 304 transmits an error message to the client computing device 102. If the login information is valid, the login module transmits resources and user interface elements to generate a web page to the client computing device 102, e.g., the portal shown in FIGS. 5A-5E.

In step 404, the order receiver module 306 receives a request to place a new order for the computing environment 108 or a request to modify an existing setup, e.g., a previously placed order for the computing environment 108. As an example, if the request is to place a new custom order, the user selects infrastructure requirements and provides a design topology for the order. The order receiver module 306 requests that the user confirm a final configuration for the order and the order is assigned a unique order identifier. If the request is a request to modify an existing setup, the request may be associated with a unique order identifier. The order receiver module retrieves usage report information for the computing environment 108 from the data source 106. The order receiver module 306 may retrieve the usage report information for the computing environment before the login information is received and/or after the login information is received from the client computing device 102. The usage report information may be viewed within the context of the object model used by the policy engine 308 and the state model used by the state engine 310.

In step 406, the comparison module 312 uses the policy engine 308 and the state engine 310 and compares one or more available offerings from the external providers 110 and the internal providers 112. The comparison is based on comparison points, e.g., infrastructure requirements, the design topology, the policy engine, and the state engine. The comparison module 312 receives stock information and availability information for computing resources from the external providers 110 and the internal providers 112 via provider API calls. Based on the on the general policies, infrastructure requirements, the design topology of the order, and the usage report information, the comparison module 312 generates a list of one or more available offerings from one or more computing resource providers, e.g., the external providers 110 and the internal providers 112.

In step 408, the comparison notifier module 314 transmits a message comprising comparison information associated with the one or more available offerings from the external providers 110 and the internal providers 112 to the client computing device. The message may be sent in response to a request from the client computing device 102 and/or may be pushed to the client computing device 102.

In step 410, the web browser 120 of the client computing device 102 receives comparison information associated with the one or more available offerings from the external providers 110 and the internal providers 112 from the computing resource comparison application 126 of the computing resource comparison computing system 104 and generates a web page showing a representation of the comparison information associated with the one or more available offerings from the external providers 110 and the internal providers 112. In one example, the web page shows the comparison information associated with the one or more available offerings from the external providers 110 and the internal providers 112, e.g., two available offerings including a first infrastructure as a service offering from an external provider 110, Amazon AWS, and a second infrastructure as a service offering from an internal provider 112, a VBLOCK. Each of the service offerings may include a name, a location, a rating, optional comments provided by the central IT user, a monthly price, and an estimated deployment time. For the one or more available offerings, the web page may show user interface elements that when selected by the input device of the client computing device 102, direct the web browser 120 to URLs for ordering the selected service offering.

Although FIG. 4 describes one example of a process that may be performed by the computing resource comparison application 126 to determine comparison information associated with the one or more available offerings from the external providers 110 and the internal providers 112, the features of the disclosed process may be embodied in other specific forms without deviating from the spirit and scope of the present disclosure. For example, the computing resource comparison application 126 may perform additional, fewer, or different operations than those operations as described in the present example. As another example, the steps of the process described herein may be performed by a computing system other than the computing resource comparison computing system 104, which may be, for example, one of the virtual objects executed on the virtual computing environment.

Figure 5A:
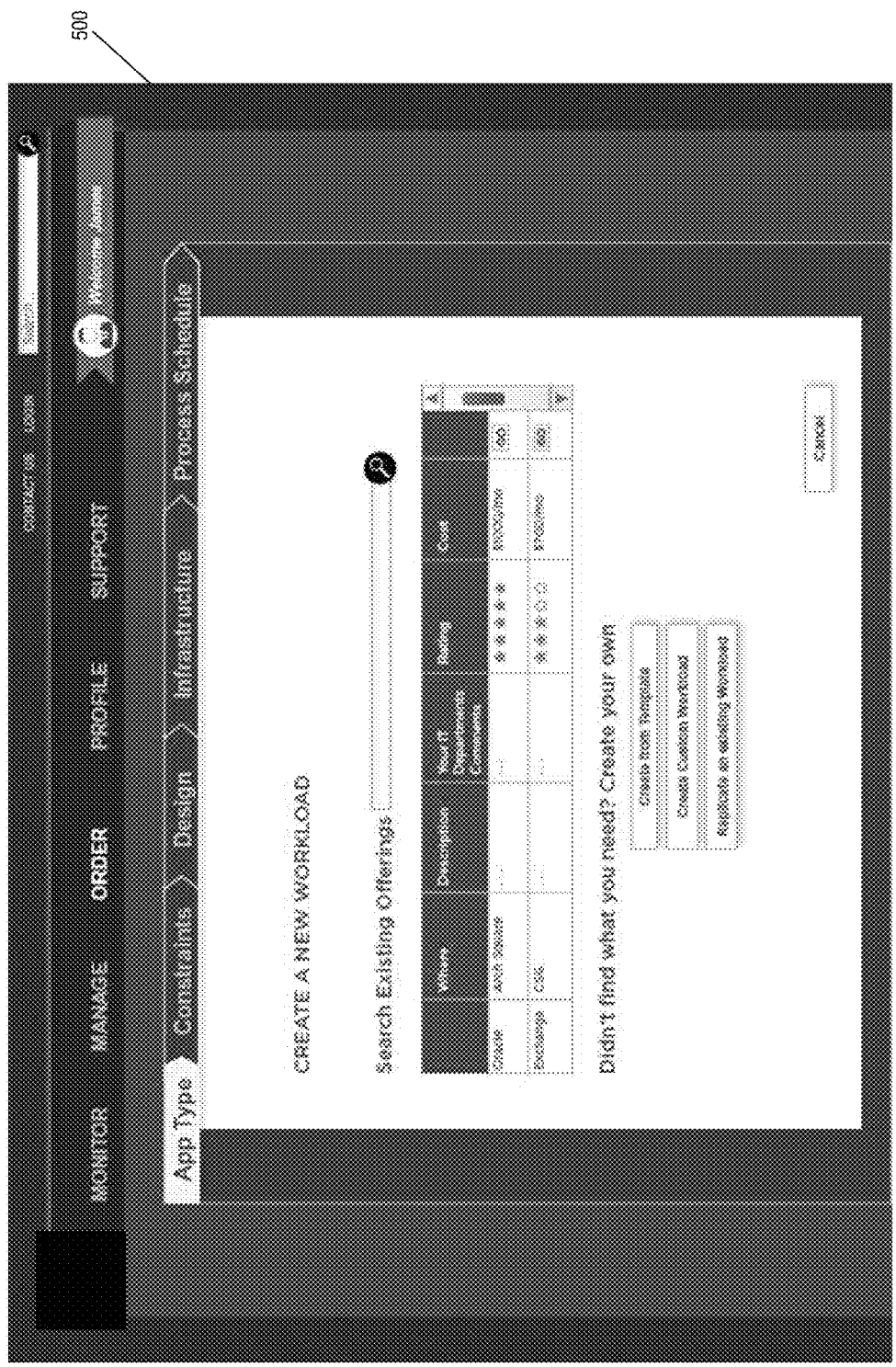
FIGS. 5A-5E illustrate screenshots of a portal provided by the computing resource comparison application according to one embodiment of the present disclosure.

FIG. 5A shows an example screenshot 500 of a user interface of the computing resource comparison application 126 executed by the computing resource comparison computing system 104 and displayed by the web browser 120 of the client computing device 102 according to an example embodiment. As shown in FIG. 5A, the portal includes a Monitor tab, a Manage tab, an Order tab (currently shown), and a Support tab. As shown in FIG. 5A, the central IT user may create a new order, e.g., a workload, by selecting one of the existing offerings from external providers 110 and internal providers 112. In addition, the user may create an order from a template, create a custom order, or replicate an existing order.

Figure 5B:
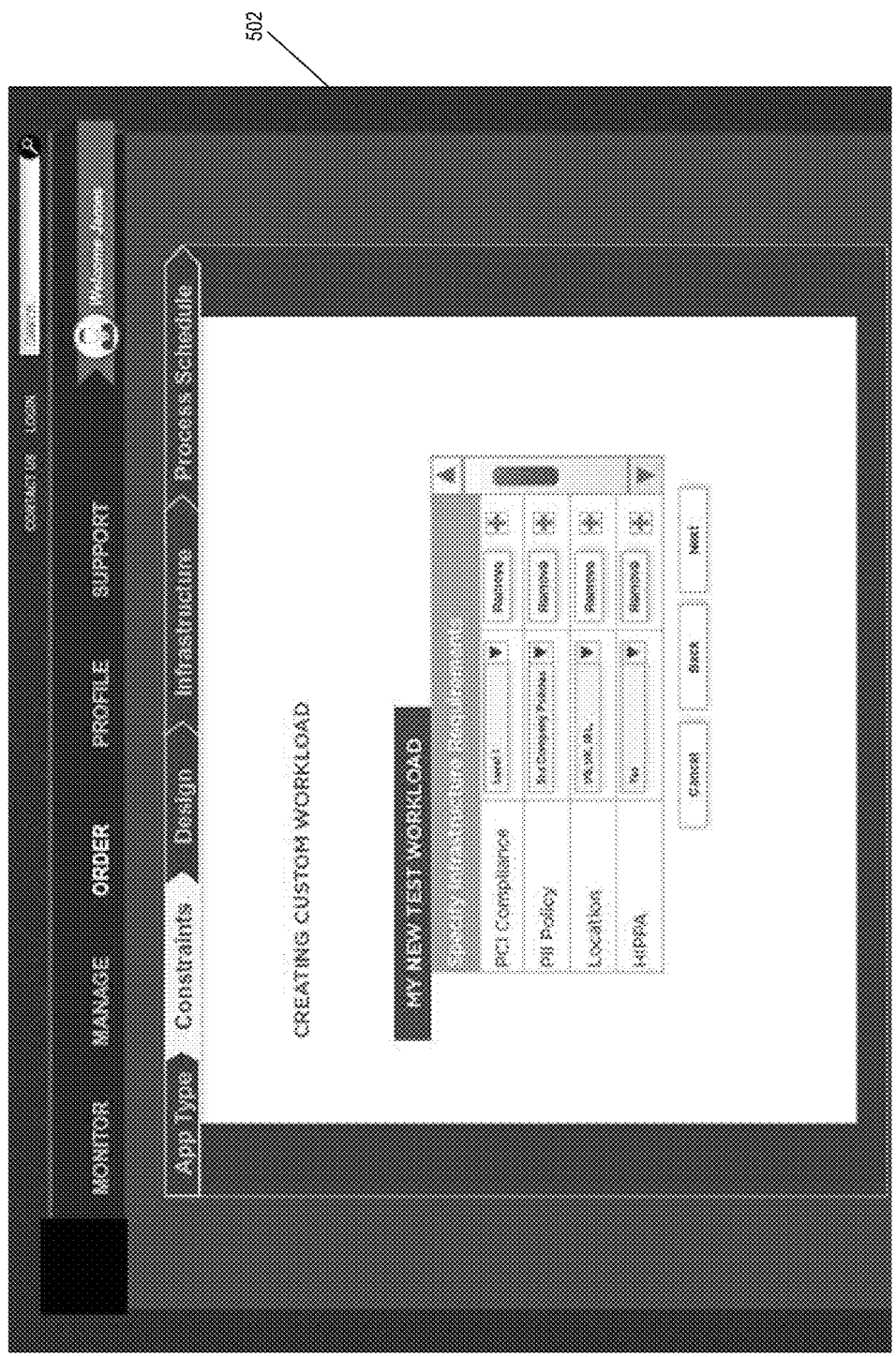
Figure 5C:
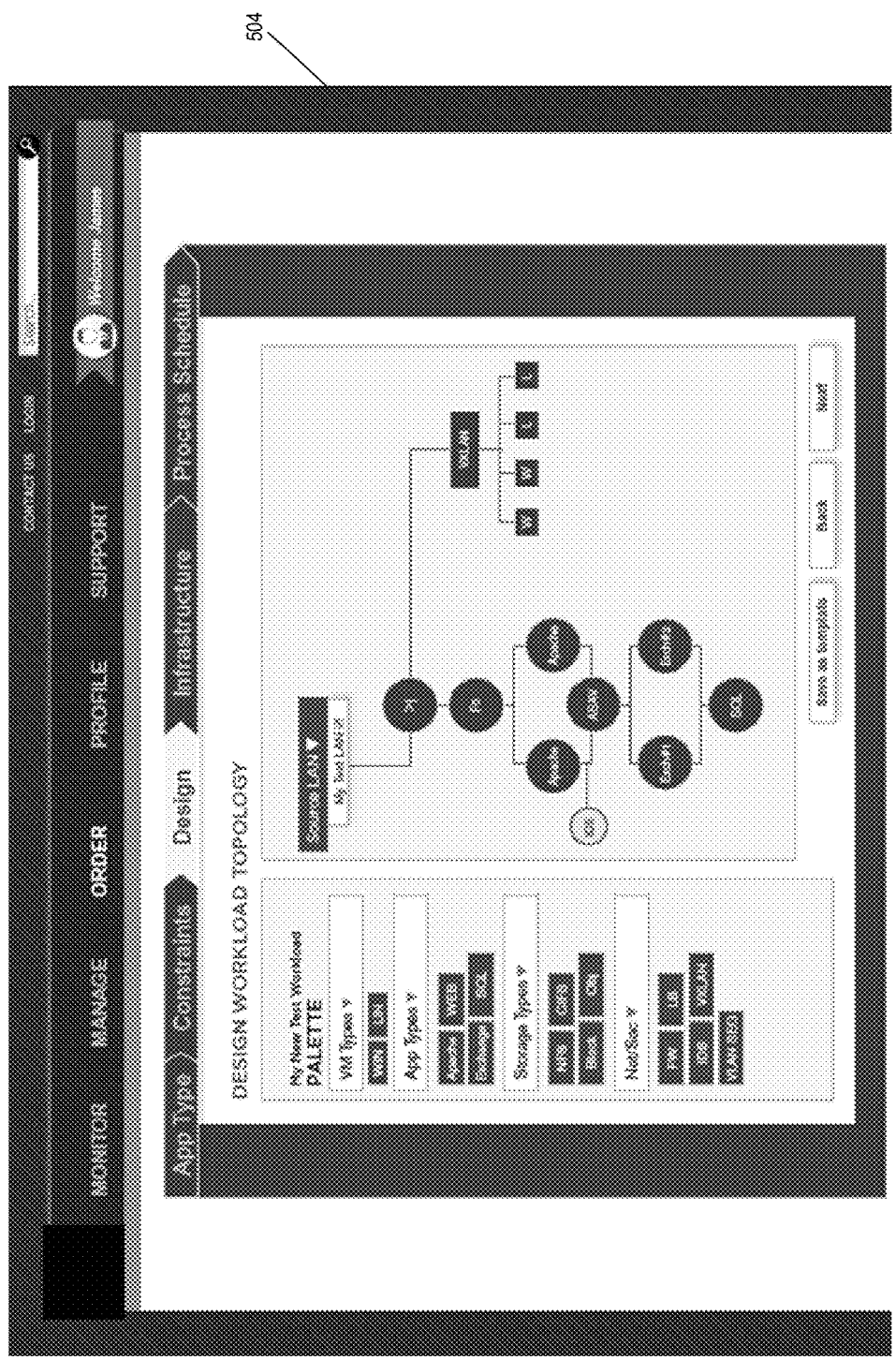

FIG. 5B shows another example screenshot 502 of a user interface of the computing resource comparison application 126 displayed by the web browser 120 of the client computing device 102 according to an example embodiment. As shown in FIG. 5B, in this example, the user creates a custom order and is presented with a user interface for selecting one or more infrastructure requirements. The user may select zero or more infrastructure requirements for the custom order. A new infrastructure requirement may be created by selecting a "+" user interface element shown in FIG. 5B. When the user selects the "+" user interface shown in FIG. 5B, a new infrastructure requirement is created. The user may select the type of infrastructure requirement and may select a value for the infrastructure requirement. As an example, FIG. 5B shows four different infrastructure requirements including a PCI Compliance infrastructure requirement, a PII Policy infrastructure requirement, a location infrastructure requirement, and a HIPAA infrastructure requirement. The user may select the "Next" user interface element to move to the user interface shown in FIG. 5C.

FIG. 5C shows another example screenshot 504 of a user interface of the computing resource comparison application 126 displayed by the web browser 120 of the client computing device 102 according to an example embodiment. FIG. 5C shows the design topology interface discussed above that is displayed when the user creates the custom order. As shown in FIG. 5C, the design topology interface includes the first palette pane that includes drop down selection boxes for selecting each of the components of the order and the second design pane for arranging and connecting the components of the order. After the user designs the custom order, the user may select the "Next" user interface element to transition to the user interface shown in FIG. 5D.

Figure 5D:
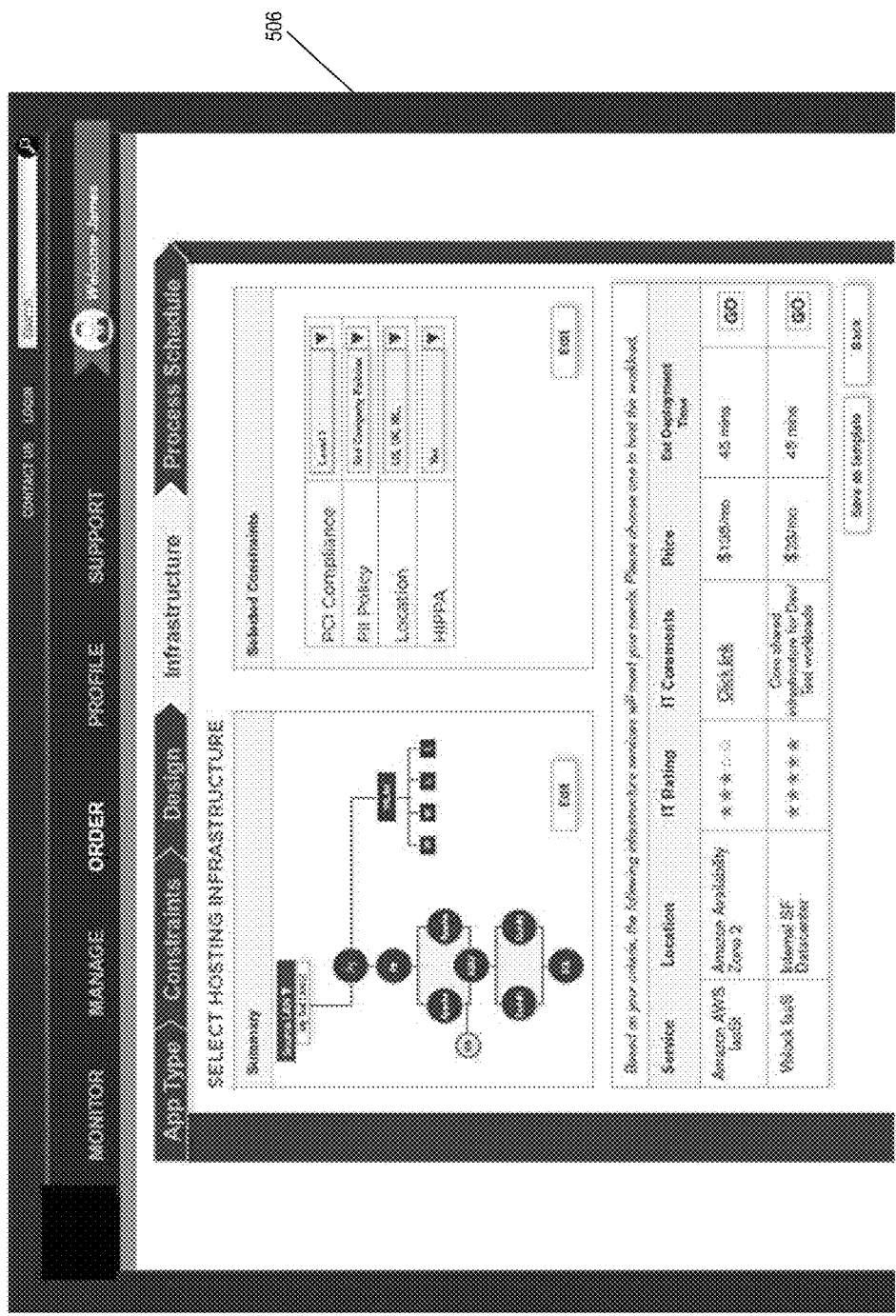

FIG. 5D illustrates another example screenshot 506 of a user interface of the computing resource comparison application 126 displayed by the web browser 120 of the client computing device 102 according to an example embodiment. As shown in FIG. 5D, the user has already selected four infrastructure requirements and has selected the design topology. If the user selects the "Edit" user interface element associated with the design topology, the user may transition back to the user interface shown in FIG. 5C. If the user selects the "Edit" user interface element associated with the infrastructure requirements, the user may transition back to the user interface shown in FIG. 5B.

As shown in FIG. 5D, the computing resource comparison application 126 determines comparison information associated with the one or more available offerings from the external providers 110 and the internal providers 112 and in this case, presents two available offerings including a first infrastructure as a service offering from an external provider 110, Amazon AWS, and a second infrastructure as a service offering from an internal provider 112, a VBLOCK. The central IT user may select the "GO" user interface element associated with the first service offering to select the first infrastructure as a service offering from an external provider 110 and may select the "GO" user interface element associated with the second infrastructure as a service offering from an internal provider 112. When the user selects one of the "GO" user interface elements and orders the service offering, the user may view an order summary user interface shown in FIG. 5E that provides details associated with the custom order.

Figure 5E:
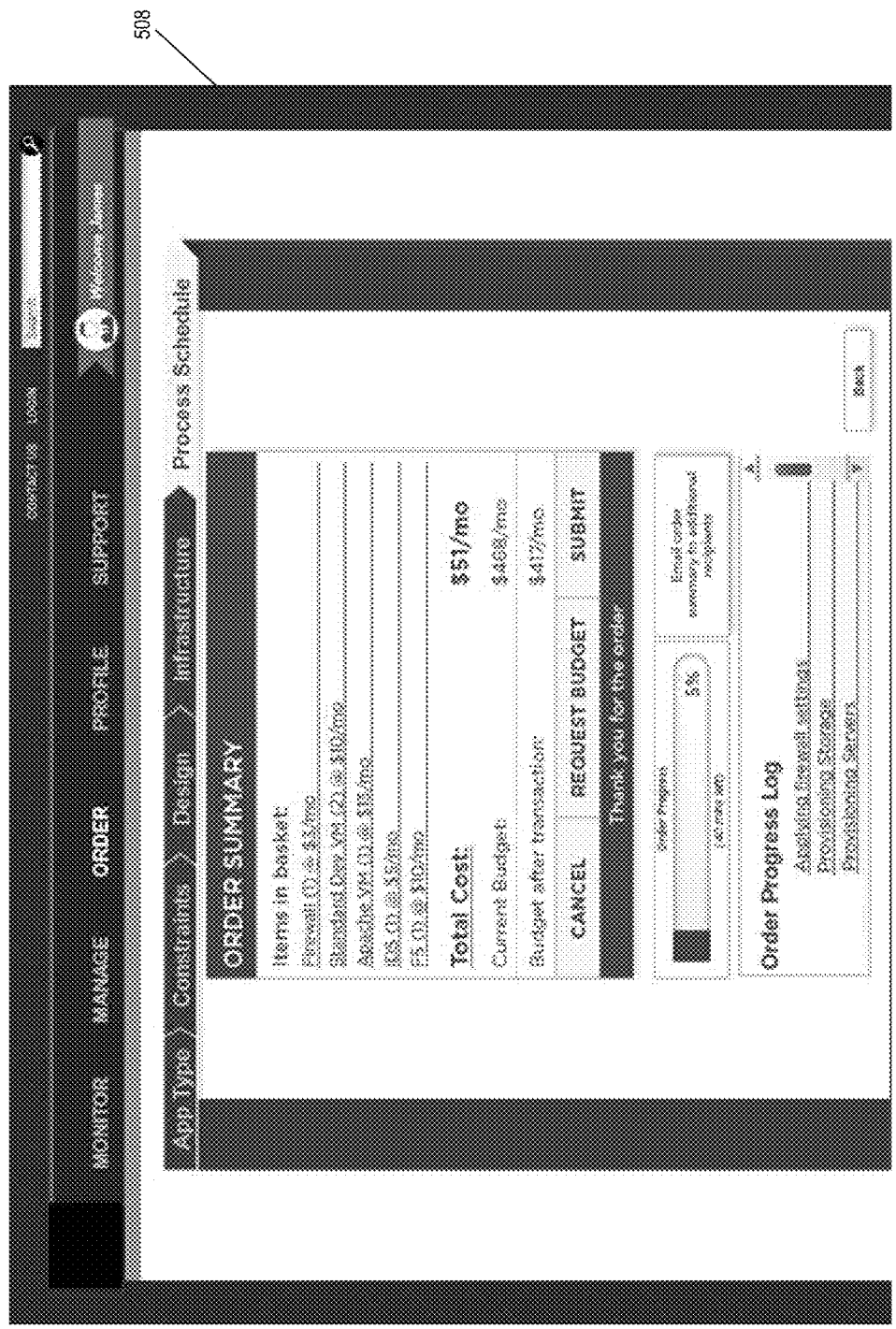

FIG. 5E illustrates an additional example screenshot 508 of a user interface of the computing resource comparison application 126 displayed by the web browser 120 of the client computing device 102 according to an example embodiment. As shown in FIG. 5E, the user interface presents a list of one or more objects associated with the custom order and their monthly prices. The user interface also presents a total cost for the custom order in comparison with a current monthly budget. In addition, the user interface presents an order progress for the custom order (e.g., 5%), an amount of time left until the custom order is complete (e.g., 40 minutes), an order process log including a list of one or more tasks for the custom order, and a user interface element for emailing the order summary to additional recipients.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
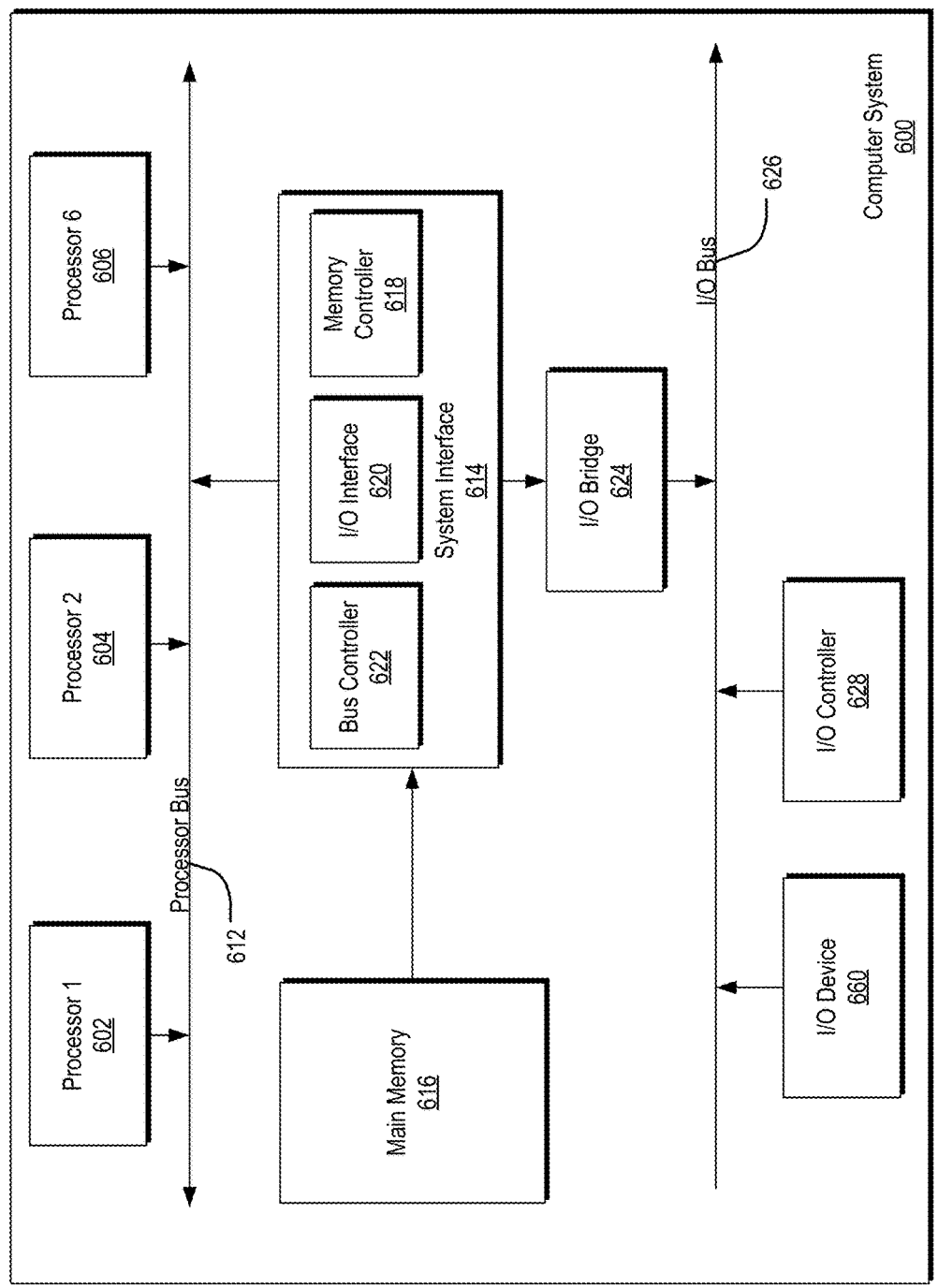
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
   at least one processor to:
   receive a request to compare at least one computing resource offering for a computing environment comprising a converged infrastructure having at least one physical hardware resource, the converged infrastructure dynamically configurable to automatically allocate and deallocate the at least one physical hardware resource to adapt the at least one physical hardware resource based on utilization of each of the at least one physical hardware resource, the request including at least one infrastructure requirement, estimated future usage for the computing environment based on past usage and an estimated growth in utilization, and a computing environment design topology, the request associated with a unique order identifier;
   transmit the request to at least one computing resource provider via at least one provider application programming interface (API), the at least one computing resource provider comprising one of an external computing resource provider and an internal computing resource provider;
   receive a list of at least one computing resource offering from the at least one computing resource provider, normalize the at least one computing resource offering based on the at least one infrastructure requirement and the computing environment design topology, and compare the at least one computing resource offering based on the at least one infrastructure requirement and the computing environment design topology; and
   send a what you see is what you get (WYSIWYG) graphical user interface representation of the list of the at least one computing resource offering based on the at least one infrastructure requirement showing the at least one physical hardware resource in a first palette pane, receive a selection and a drag of the at least one physical hardware resource to a second design pane, and receive an arrangement and connection of the at least one physical hardware resource on the second design pane to visually create the computing environment design topology, the estimated future usage for the computing environment, and the computing environment design topology indicating appropriateness for the request by sequentially ranking the list of the at least one computing resource offering from the at least one computing resource provider that ranks each of the at least one computing resource offering from the at least one computing resource provider from highest to lowest based on a best match to the computing environment design topology created using the WYSIWYG graphical user interface and dynamically adjust the at least one physical hardware resource to scale based on the utilization of each of the at least one physical hardware resource by adding a highest ranked computing resource offering from the at least one computing resource provider.

2. The system of claim 1, wherein the request to compare the at least one computing resource offering comprises one of a request for a new order for the computing environment and a request to modify a previously placed order for the computing environment.

3. The system of claim 2, wherein the request for the new order for the computing environment comprises one of a new order based on a template, a custom order, and a duplicate of an existing order previously placed.

4. The system of claim 1, the at least one processor further to search for the at least one computing resource offering, the search responsive to an alphanumeric search query that is compared with metadata of the at least one computing resource offering.

5. The system of claim 1, the at least one processor further to receive for the at least one computing resource offering, at least one of a name, a location, a rating, comments, a monthly price, and an estimated deployment time.

6. The system of claim 1, wherein the at least one infrastructure requirement comprises at least one comparison point associated with at least one of performance, availability, configuration, cost, compliance, and security, the at least one processor further to compare the at least one computing resource offering based on the at least one comparison point.

7. The system of claim 1, the at least one processor further to send a graphical user interface for receiving the at least one infrastructure requirement for the computing environment and send a graphical user interface for receiving the computing environment design topology.

8. The system of claim 1, the at least one processor further to:
assign the request the unique order identifier;
store the unique order identifier in a data source along with an order time; and
determine stock information and availability information for the at least one computing resource offering from the at least one computing resource provider.

9. The system of claim 1, the at least one processor further to communicate the list of the at least one computing resource offering based on the at least one infrastructure requirement and the computing environment design topology indicating appropriateness for the request in response to a comparison application programming interface (API) request.

10. A method, comprising:
receiving, by at least one processor, a request to compare at least one computing resource offering for a computing environment comprising a converged infrastructure having at least one physical hardware resource, the converged infrastructure dynamically configurable to automatically allocate and deallocate the at least one physical hardware resource to adapt the at least one physical hardware resource based on utilization of each of the at least one physical hardware resource, the request including at least one infrastructure requirement, estimated future usage for the computing environment based on past usage and an estimated growth in utilization, and a computing environment design topology, the request associated with a unique order identifier;
transmitting, by the at least one processor, the request to at least one computing resource provider via at least one provider application programming interface (API), the at least one computing resource provider comprising one of an external computing resource provider and an internal computing resource provider;
receiving, by the at least one processor, a list of at least one computing resource offering from the at least one computing resource provider, normalizing the at least one computing resource offering based on the at least one infrastructure requirement and the computing environment design topology, and comparing the at least one computing resource offering based on the at least one infrastructure requirement and the computing environment design topology; and
sending, by the at least one processor, a what you see is what you get (WYSIWYG) graphical user interface representation of the list of the at least one computing resource offering based on the at least one infrastructure requirement showing the at least one physical hardware resource in a first palette pane, receiving a selection and a dragging of the at least one physical hardware resource to a second design pane, and receiving an arrangement and connection of the at least one physical hardware resource on the second design pane to visually create the computing environment design topology, the estimated future usage for the computing environment, and the computing environment design topology indicating appropriateness for the request by sequentially ranking the list of the at least one computing resource offering from the at least one computing resource provider that ranks each of the at least one computing resource offering from the at least one computing resource provider from highest to lowest based on a best match to the computing environment design topology created using the WYSIWYG graphical user interface and dynamically adiustinq the at least one physical hardware resource to scale based on the utilization of each of the at least one physical hardware resource by adding a highest ranked computing resource offering from the at least one computing resource provider.

11. The method of claim 10, further comprising receiving the request to compare the at least one computing resource offering, the request comprising one of a request for a new order for the computing environment and a request to modify a previously placed order for the computing environment.

12. The method of claim 11, further comprising receiving the request to compare the at least one computing resource offering, the request for the new order for the computing environment comprising one of a new order based on a template, a custom order, and a duplicate of an existing order previously placed.

13. The method of claim 10, further comprising searching for the at least one computing resource offering, the search responsive to an alphanumeric search query that is compared with metadata of the at least one computing resource offering.

14. The method of claim 10, further comprising receiving for the at least one computing resource offering, at least one of a name, a location, a rating, comments, a monthly price, and an estimated deployment time.

15. The method of claim 10, wherein the at least one infrastructure requirement comprises at least one comparison point associated with at least one of performance, availability, configuration, cost, compliance, and security, the method further comprising comparing the at least one computing resource offering based on the at least one comparison point.

16. The method of claim 10, further comprising sending a graphical user interface for receiving the at least one infrastructure requirement for the computing environment and sending a graphical user interface for receiving the computing environment design topology.

17. The method of claim 10, further comprising:
assigning the request the unique order identifier;
storing the unique order identifier in a data source along with an order time; and
determining stock information and availability information for the at least one computing resource offering from the at least one computing resource provider.

18. The method of claim 10, further comprising communicating the list of the at least one computing resource offering based on the at least one infrastructure requirement and the computing environment design topology indicating appropriateness for the request in response to a comparison application programming interface (API) request.

19. A non-transitory computer-readable medium having instructions stored thereon that, when executed by at least one processor, cause the at least one processor to perform operations comprising:

receiving a request to compare at least one computing resource offering for a computing environment comprising a converged infrastructure having at least one physical hardware resource, the converged infrastructure dynamically configurable to automatically allocate and deallocate the at least one physical hardware resource to adapt the at least one physical hardware resource based on utilization of each of the at least one physical hardware resource, the request including at least one infrastructure requirement, estimated future usage for the computing environment based on past usage and an estimated growth in utilization, and a computing environment design topology, the request associated with a unique order identifier;

transmitting the request to at least one computing resource provider via at least one provider application programming interface (API), the at least one computing resource provider comprising one of an external computing resource provider and an internal computing resource provider;

receiving a list of at least one computing resource offering from the at least one computing resource provider, normalizing the at least one computing resource offering based on the at least one infrastructure requirement and the computing environment design topology, and comparing the at least one computing resource offering based on the at least one infrastructure requirement and the computing environment design topology; and sending a what you see is what you get (WYSIWYG) graphical user interface representation of the list of the at least one computing resource offering based on the at least one infrastructure requirement showing the at least one physical hardware resource in a first palette pane, receiving a selection and a dragging of the at least one physical hardware resource to a second design pane, and receiving an arrangement and connection of the at least one physical hardware resource on the second design pane to visually create the computing environment design topology, the estimated future usage for the computing environment, and the computing environment design topology indicating appropriateness for the request by sequentially ranking the list of the at least one computing resource offering from the at least one computing resource provider that ranks each of the at least one computing resource offering from the at least one computing resource provider from highest to lowest based on a best match to the computing environment design topology created using the WYSIWYG graphical user interface and dynamically adjusting the at least one physical hardware resource to scale based on the utilization of each of the at least one physical hardware resource by adding a highest ranked computing resource offering from the at least one computing resource provider.

20. The non-transitory computer-readable medium of claim 19, the operations further comprising communicating the list of the at least one computing resource offering based on the at least one infrastructure requirement and the computing environment design topology indicating appropriateness for the request in response to a comparison application programming interface (API) request.

* * * * *